March 5, 1957     F. J. HOOT     2,783,953
ANTIBACKLASH REEL
Filed Dec. 12, 1955
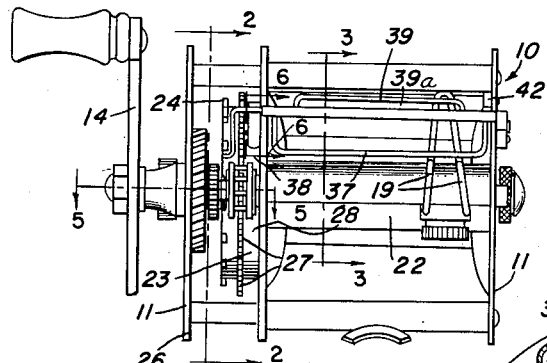
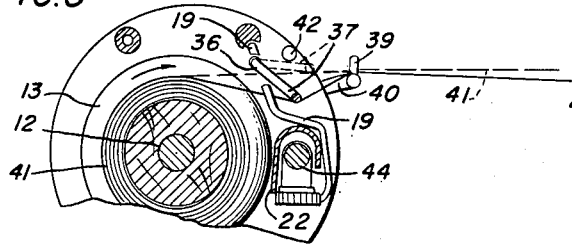
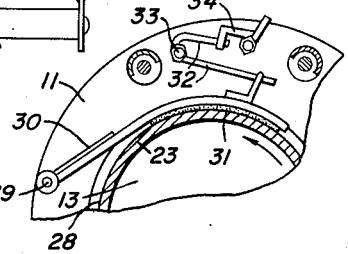
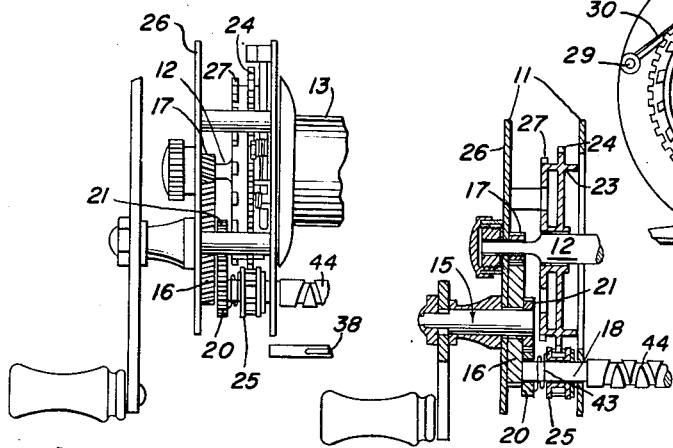
INVENTOR
FRANK J. HOOT
BY    *Beale and Jones*
ATTORNEYS

United States Patent Office 2,783,953
Patented Mar. 5, 1957

2,783,953

ANTIBACKLASH REEL

Frank J. Hoot, Tulsa, Okla.

Application December 12, 1955, Serial No. 552,406

7 Claims. (Cl. 242—84.5)

This invention relates to fishing reels and more particularly to improved means for automatically preventing "backlash," i. e., the unwinding of the line from the spool when the tension on the line slackens during casting.

My prior Patent No. 2,601,021 shows an antibacklash fishing reel having means, when the line slackens, first for retarding the rotation of the spool, and then for preventing further rotation thereof. Reels constructed in accordance with the teachings of that patent work satisfactorily, but I have discovered new and improved means for preventing backlash which is more rugged and better adapted to production, requiring fewer changes in the structure of conventional fishing reels.

One object of my invention is to provide a brake and stop drum which (1) is geared to rotate with, but at a slower speed than the hand crankshaft, and therewith, but at a still slower speed than the spool, and (2) means responsive to slackening line tension to apply a positive stop to said drum and thereby stop the rotation of the spool. Another object is to provide means to apply an adjustable drag or braking force to said brake and stop drum. Another object is to utilize the gearing to the usual line traversing mechanism for driving the brake and stop drum, thereby providing minimum added gearing and minimum changes from conventional fishing reel structure.

Other objects of my invention will be apparent from the following description and from the appended drawings, wherein like characters indicate the same or similar parts:

Fig. 1 is a front elevation of a fishing reel made in accordance with my invention;

Fig. 2 is a sectional view taken on line 2—2 of Fig. 1;

Fig. 3 is a fragmentary section taken on line 3—3 of Fig. 1, with line guide 19 broken away so as to show bail 37 more clearly;

Fig. 4 is a fragmentary plan view of a portion of the same;

Fig. 5 is a fragmentary horizontal section taken on line 5—5 of Fig. 1, certain parts being omitted for the sake of clarity; and Fig. 6 is a fragmentary section, to enlarged scale taken on line 6—6 of Fig. 1.

The drawings show a preferred embodiment of my invention incorporated in a fishing reel generally designated 10, said reel comprising a frame 11, a spool 13 fixed to shaft 12 for rotation therewith, a hand crank 14 fixed to a crankshaft 15 journaled in frame 11, and a gear 16 fixed on shaft 15 which meshes with a pinion 17 fixed on shaft 12. Reel 10 also has line traversing means comprising a traversing shaft 18 rotatably mounted in frame 11, a traversing line guide 19 actuated by suitable cam means 44 on said traversing shaft, and a gear 20 fixed on said traversing shaft meshing with a gear 21 fixed on said crankshaft. A guard 22 is provided over traversing shaft 18. The portions of the reel thus far described are conventional and form no part of my invention.

In accordance with my invention, I provide a rotatable stop and brake drum 23. As shown in the drawings, I prefer to mount drum 23 rotatably on spool shaft 12. Integral with or rigidly attached to drum 23 is a gear wheel 24 which meshes with a pinion 25 rotatably mounted on traversing shaft 18 adjacent gear 20. A helical shock absorbing spring 43 on shaft 18 connects pinion 25 to gear 20, so that pinion 25 moves resiliently with gear 21. Gears 20 and 21 and pinion 25 are of approximately the same diameter, but gear 24 is of much larger diameter. Thus, drum 23 rotates at a substantially slower speed in revolutions per minute than does shaft 15. Similarly, because gear 16 is substantially of larger diameter than pinion 17, spool 13 rotates at a substantially higher speed in revolutions per minute than does shaft 15. The connections between spool 13 and drum 23, comprising shaft 12, pinion 17, gear 16, shaft 15, gear 21, gear 20, spring 43, pinion 25, and gear 24 have a gear ratio such that spool 13 rotates approximately 20 revolutions for each revolution of drum 23. Although this gear ratio has been found to be best, other ratios may be used if desired. However, for the most satisfactory performance the gear ratio should give at least five revolutions of the spool for each revolution of the drum.

As noted above, gears 16, 17, 20 and 21 are conventional. Besides the gear 24 on drum 23, only one additional gear, i. e. pinion 25 is required. It is therefore easy to to modify an existing reel to incorporate my invention. Side member 26 is spaced farther from the main portion of frame 11. Longer shafts 12 and 18 are substituted for the original shafts. Pinion 25 is rotatably mounted on shaft 18 and connected to gear 20 by spring 43. Drum 23 is rotatably mounted on shaft 12 with gear 24 meshing with pinion 25. The control or drag brake and the other elements described below are also installed easily.

Drum 23 has a plurality of inclined stop lugs 27 mounted around its periphery and a brake surface 28 adjacent said lugs. Pivotally mounted on frame 11 as at 29 is a control or adjustable drag brake arm 30 having a brake shoe 31. Brake shoe 31 is spring biased against surface 28 by a spring 32 pivoted to frame 11 at 33. Adjustment means 34 is provided for regulating the pressure of spring 32 against brake shoe 31, or for lifting brake shoe 31 clear of drum 23 in the event that no drag is desired.

Pivotally mounted in frame 11 at 35 and 36 is a line bail 37 having an extension 38. A fair lead or line guide 39 having a broad opening 39a is disposed across the front of the reel, being supported on frame 11 by a suitable extension 40.

Referring to Fig. 3, the line 41, wound on spool 13, extends outwardly from the spool between the sides of traversing guide members 19, under bail 37, and through fair lead opening 39a. Bail 37 rests on line 41. The line and bail are shown in full lines in the positions they assume when the line is slack. The positions of the bail and line when the line is taut are shown in broken lines.

Figures 1 and 2 show, in full lines, the position of extension 38 when the line is slack. It will be noted that, in this position, extension 38 falls between a pair of adjacent lugs 27 on drum 23. Fig. 2 shows, in broken lines, the position of extension 38 when the line is taut, corresponding to the broken line position of 37 illustrated in Figs. 2 and 3. A stop 42 fixed to frame 11 limits the upward movement of bail 37.

Thus it will be seen that bail 37 and extension 38 have an upper or release position when the line is taut, and a lower or stop position when the line is slack. In this latter position, extension 38 has a portion lying in the path of the lugs 27. In the embodiment illustrated, drum 23 rotates in the opposite direction to that of spool 13, the arrows of Figs. 2, 3 and 6 indicating the directions of rotation of the drum and spool respectively when the line is running out. It will thus be seen from Fig. 2 that, when the line slackens, and after drum 31 has rotated counterclockwise a short distance, the next lug 27 on drum 23 will come up against the end of extension 38 of bail 37 and thereby check further counterclockwise rotation of drum 23. Because spool 13 is connected by gearing to drum 23 it too will be brought to a stop. As explained above, in the illustrated embodiment, spool 13 rotates approximately 20 revolutions for each revolution of drum 23. In the illustrated embodiment there are eighteen spaced lugs 27 on drum 23. The spool, therefore, may rotate about one revolution, or less, after extension 38 falls, and this may result in a small amount of slack line surrounding the spool. The resulting slackness is so slight, however, as to cause no difficulty. The lugs may be placed more closely together if desired, but the spacing shown in the illustrated embodiment has been found satisfactory. Member 37—38 is made of steel wire, and extension 38 may "give" or bend slightly to absorb some of the shock when it stops the moving parts. This shock is, however, absorbed almost entirely by shock-absorbing spring 43 which connects gear 21 and pinion 25.

It will be noted that lugs 27 are lightly inclined, as viewed in Fig. 2, and that the direction of inclination, which is outwardly in a counterclockwise direction, is such as to insure that extension 38 will not slip outwardly and away from drum 23 once it has fallen in the path of a lug 27. The inclination on the trailing surface of lugs 27, that is, the surfaces which are trailing when drum 23 is rotating in a counterclockwise direction as viewed in Fig. 2, are such that, when the direction of rotation of drum 23 is reversed to wind in the line after a cast, extension 38 is cammed away from drum 23 by the inclination of lugs 27. In addition, as the line tightens when it is being reeled in, it lifts bail 37 and extension 38 clear of drum 23.

The operation of my improved antibacklash device will be apparent from the foregoing description. When the line is taut, as illustrated in broken lines in Figures 2 and 3, as when casting or when reeling in, bail 37 is lifted by the line so that extension 38 is clear of lugs 27. When the line slackens slightly, bail 37 falls and extension 38 falls in the path of the next lug 27, thereby stopping drum 23 and spool 13 to prevent backlash or tangling of the line on spool 13. When handcrank 14 is turned to reel in the line, the inclination of lugs 27 is such that bail 38 is forced outwardly, so that there is no interference with winding in the line. Adjustment 34 is regulated to press drag brake shoe 31 against brake surface 28 of drum 23 to obtain the desired constant "drag" effect. If no drag is desired, adjustment 34 is turned (clockwise as viewed in Fig. 6) sufficiently to lift brake shoe 31 just clear of brake surface 28. Thus an adjustable constant drag is provided in combination with the reel stop mechanism.

Although for the sake of clarity the drawings show the gearing and other working parts between the hand crank and the spool as being exposed, in practice a casing encloses them, so that dirt and water are excluded.

Tests show that this antibacklash device is very effective in stopping rotation of the spool and preventing "backlash" or tangling of the line, even when the plug hits an obstruction, or strikes the water immediately in front of the caster. Tests also showed that a person of average skill who can cast a three-eights to five-eights ounce plug about 75 to 80 feet without this antibacklash device can cast a one-quarter ounce plug consistently the same distance with this device, a twelve and a half pound test line being used in these tests. Any weight line can be used. The reel has been tested thoroughly and has proved to be entirely satisfactory.

Although a preferred embodiment has been shown and described, this is to be considered as illustrative and not limiting. Other embodiments, as well as numerous changes, all within the scope of the appended claims, will be apparent to those skilled in the art.

I claim:

1. A fishing reel comprising a frame, a spool rotatably mounted in said frame, a drum rotatably mounted in said frame, said drum having a plurality of stop lugs spaced around its periphery, gearing connecting said drum with said spool for rotating said drum at a speed slower than one-fifth the rotational speed of said spool, a line on said spool leading outwardly therefrom, a line bail pivotally mounted in said frame engaging said line leading outwardly from said spool, said bail being lifted to a release position when said line is taut and lowered to a stop position when said line is slack, and an extension on said bail for engaging one of said stop lugs to stop the rotation of said drum and said spool when said bail is in said stop position and for releasing said drum and said spool when said bail is in said release position; whereby, in casting with said reel said line may run out until it slackens, whereupon said bail extension will stop the rotation of said spool through said drum and gearing.

2. A fishing reel comprising a frame, a spool rotatably mounted in said frame, a drum rotatably mounted in said frame, said drum having a brake surface and a plurality of stop lugs spaced around the periphery of said drum, a brake shoe spring-biased against said surface, means for adjusting the pressure of said shoe against said surface, gearing connecting said drum with said spool for rotating said drum at a speed slower than one-fifth the rotational speed of said spool, a line on said spool leading outwardly therefrom, a line bail pivotally mounted in said frame engaging said line leading outwardly from said spool, said bail being lifted to a release position when said line is taut and lowered to a stop position when said line is slack, and an extension on said bail for engaging one of said stop lugs to stop the rotation of said drum and said spool when said bail is in said stop position and for releasing said drum and said spool when said bail is in said release position; whereby, in casting with said reel said brake shoe will apply a predetermined drag to said spool through said drum and gearing and said line may run out until it slackens, whereupon said bail extension will stop the rotation of said spool through said drum and gearing.

3. A fishing reel comprising a frame, a spool rotatably mounted in said frame, a hand crank shaft journaled in said frame, gearing connecting said shaft to said spool for rotating said spool faster than said shaft, a line on said spool leading outwardly therefrom, a drum rotatably mounted in said frame, said drum having a plurality of stop lugs spaced around the periphery thereof, gearing connecting said drum with said shaft for rotating said drum slower than said shaft, a line bail pivotally mounted in said frame engaging said line leading outwardly from said spool, said bail being lifted to a release position when said line is taut and lowered to a stop position when said line is slack, and an extension on said bail for engaging one of said stop lugs to stop the rotation of said drum and said spool when said bail is in said stop position and for releasing said drum and said spool when said bail is in said release position; whereby, in casting with said reel said line may run out until it slackens, whereupon said bail extension will stop the rotation of said spool through said drum and said gearing connecting said drum to said shaft and said shaft to said spool.

4. A fishing reel comprising a frame, a spool rotatably mounted in said frame, a hand crank shaft journaled in said frame, gearing connecting said shaft to said spool for rotating said spool faster than said shaft, a line on said spool leading outwardly therefrom, a drum rotatably mounted in said frame, said drum having a brake surface and a plurality of stop lugs spaced around the periphery of said drum, a brake shoe spring-biased against said surface, means for adjusting the pressure of said shoe against said surface, gearing connecting said drum with said shaft for rotating said drum slower than said shaft, a line bail pivotally mounted in said frame engaging said line leading outwardly from said spool, said bail being lifted to a release position when said line is taut and lowered to a stop position when said line is slack, and an extension on said bail for engaging one of said stop lugs to stop the rotation of said drum and said spool when said bail is in said stop position and for releasing said drum and said spool when said bail is in said release position; whereby, in casting with said reel said brake shoe will apply a predetermined drag to said spool through said drum and gearing, and said line may run out until it slackens, whereupon said bail extension will stop the rotation of said spool through said drum and gearing.

5. A fishing reel comprising a frame, a spool shaft rotatably mounted in said frame, a spool fixed to said shaft, a hand crank shaft journaled in said frame, gearing connecting said crank shaft to said spool shaft for rotating said spool faster than said crank shaft, a line on said spool leading outwardly therefrom, line traversing means having a rotatable traversing shaft geared to said crank shaft for rotation therewith, a drum rotatably mounted on said spool shaft, said drum having a plurality of stop lugs spaced around its periphery and a brake surface, a brake shoe spring-biased against said brake surface, means for adjusting the pressure of said shoe against said surface, gearing connecting said drum with said traversing shaft for rotating said drum at a slower speed than said crank shaft, a line bail pivotally mounted in said frame engaging said line leading outwardly from said spool, said bail being lifted by said line to a release position when said line is taut and lowered to a stop position when said line is slack, and an extension on said bail for engaging one of said stop lugs to stop the rotation of said drum and said spool when said bail is in said stop position and for releasing said drum and said spool when said bail is in said release position; whereby, in casting with said reel said brake shoe will apply a predetermined drag to said spool through said drum and gearing, and said line may run out until it slackens, whereupon said bail extension will stop the rotation of said spool through said drum and gearing.

6. A fishing reel comprising a frame, a spool shaft rotatably mounted in said frame, a spool fixed to said shaft for rotation therewith, a hand crank shaft journaled in said frame, gearing connecting said crank shaft to said spool shaft for rotating said spool faster than said crank shaft, a line on said spool leading outwardly therefrom, line traversing means having a rotatable traversing shaft geared to said crank shaft for rotation therewith, a drum rotatably mounted on said spool shaft, said drum having a plurality of stop lugs spaced around its periphery, gearing connecting said drum with said traversing shaft for rotating said drum at a slower speed than said crank shaft, a line bail pivotally mounted in said frame engaging said line leading outwardly from said spool, said bail being lifted by said line to a release position when said line is taut and lowered to a stop position when said line is slack, and an extension on said bail for engaging one of said stop lugs to stop the rotation of said drum and said spool when said bail is in said stop position and for releasing said drum and said spool when said bail is in said release position; whereby, in casting with said reel said line may run out until it slackens, whereupon said bail extension will stop the rotation of said spool.

7. A fishing reel comprising a frame, a spool rotatably mounted in said frame, a drum rotatably mounted in said frame, said drum having a plurality of stop lugs spaced around its periphery, gearing connecting said drum with said spool for rotating said drum at a speed slower than one-fifth of the rotational speed of said spool, a line on said spool leading outwardly therefrom, a line bail pivotally mounted in said frame engaging said line leading outwardly from said spool, said bail being lifted to a release position when said line is taut and lowered to a stop position when said line is slack, an extension on said bail for engaging one of said stop lugs to stop the rotation of said drum and said spool when said bail is in said stop position and for releasing said drum and said spool when said bail is in said release position, and a shock-absorbing spring in said gearing for absorbing the shock between said extension on said bail and said spool when said extension stops the rotation of said drum; whereby, in casting with said reel said line may run out until it slackens, whereupon said extension will stop the rotation of said spool through said shock-absorbing spring.

References Cited in the file of this patent
UNITED STATES PATENTS

| | | |
|---|---|---|
| 1,413,816 | Wherry | Apr. 25, 1922 |
| 2,272,834 | Drautz | Feb. 10, 1942 |